United States Patent Office 3,450,111
Patented June 17, 1969

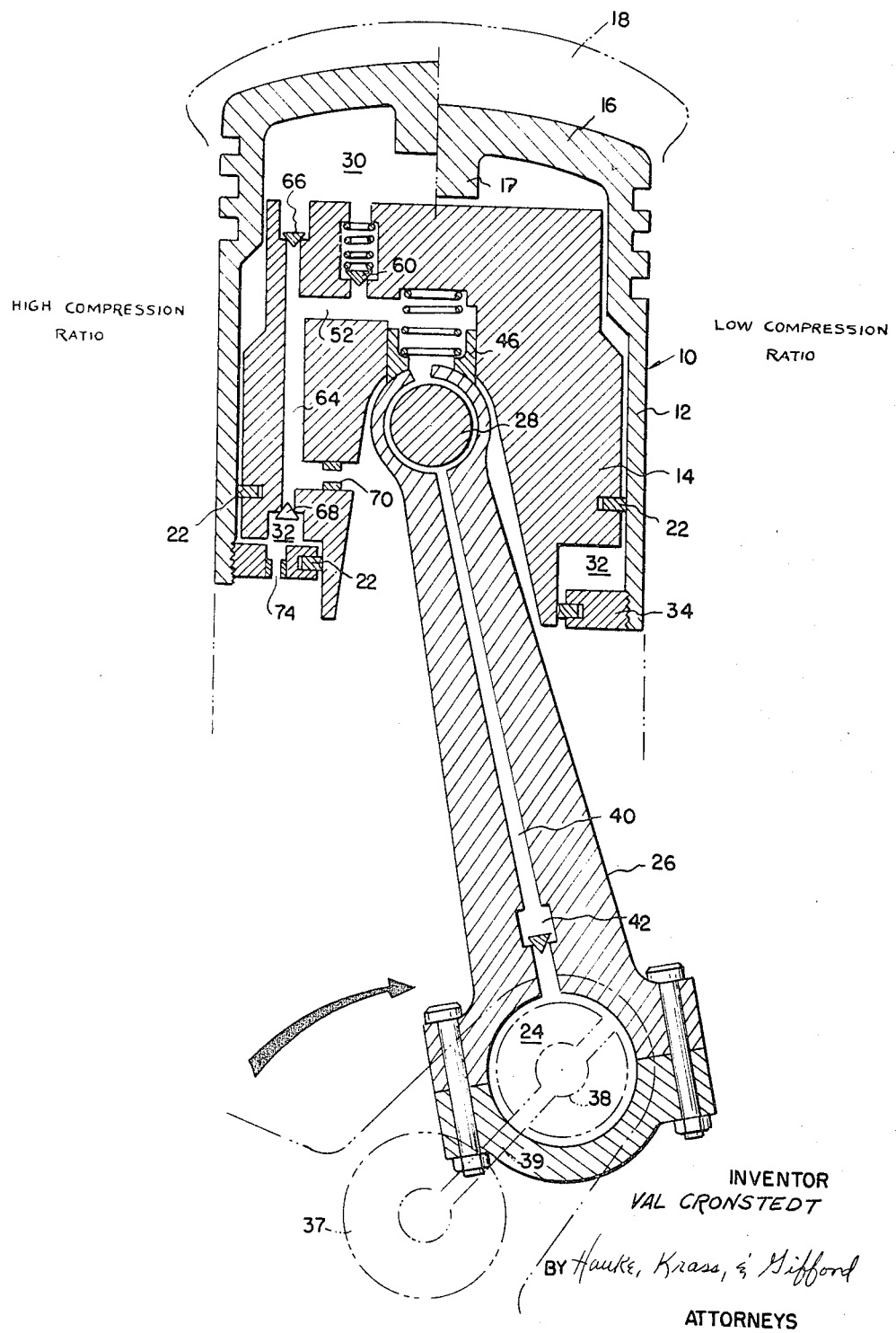

3,450,111
VARIABLE COMPRESSION RATIO PISTON ASSEMBLY
Val Cronstedt, Williamsport, Pa., assignor to Continental Aviation and Engineering Corporation, Detroit, Mich., a corporation of Virginia
Filed Oct. 24, 1967, Ser. No. 677,672
Int. Cl. F02b 75/04
U.S. Cl. 123—78     9 Claims

ABSTRACT OF THE DISCLOSURE

A two-part variable compression ratio piston having an upper and a lower variable chamber containing incompressible fluid and having interconnecting means with predetermined orifices for dividing the fluid flow from the upper chamber to the crankcase and lower chamber and wherein the ratio of flow from the upper to the lower chamber is substantially equal to the ratio of the volumetric change of the upper chamber to that of the lower chamber.

BACKGROUND OF THE INVENTION

The present invention relates to internal combustion engines employing two part pistons for varying the compression ratio and more particularly to improved means for controlling the relative movement of such parts such as disclosed in the co-pending applications: Ser. No. 654,803 filed in the name of Edward F. Blackburne on July 20, 1967, now U.S. Patent No. 3,403,662, issued Oct. 1, 1968 and Ser. No. 654,804 filed in the name of William J. Waugaman on July 20, 1967, now U.S. Patent No. 3,418,982 issued Dec. 31, 1968, both assigned to the assignee herein.

In an internal combustion engine it is to mechanical advantage to maintain the peak cycle pressure at a predetermined constant value irrespective of the engine power output, that is, not to have a very high peak pressure at high power output at the expense of weight and cost and still provide cycle pressures high enough at low power to permit easy starting and efficient part power operation.

The peak cycle pressure is made up of two increments namely that portion of the pressure resulting from the compression ratio and that portion resulting from the burning of the fuel. The compression ratio determines the magnitude of the first increment. This ratio in an internal combustion engine cylinder is the ratio of the total cylinder volume at the bottom of the piston stroke to the volume of the clearance space above the piston when it is at the top of the stroke. When more fuel is added to the compressed air in the cylinder to obtain increased power, as in a diesel engine the second increment increases in magnitude. It is then desirable to lower the compression increment of the peak pressure in order not to exceed that selected maximum total peak pressure.

It is desirable that the change of the compression ratio is achieved automatically to accommodate variations in engine power output. A powerful means of so changing the compression ratio of a cylinder is to maintain the length of the stroke and change the volume of the clearance space. A convenient means to achieve this objective is to automatically vary the distance between the top of the piston and the piston wrist pin. A variable compression ratio piston does this.

Such a piston consists essentially of two parts, an inner part or piston pin carrier connected to the crankshaft crank pin at a fixed distance by the connecting rod and an outer part or piston ring carrier. These parts are designed in such a manner that an upper and a lower chamber as formed within the piston assembly. The two parts of the assembly are free to move axially with respect to each other along the cylinder center line to increase the volume of one chamber while the volume of the other decreases. By filling the two chambers with an incompressible fluid such as engine lubricating oil and by preventing its escape the two parts are solidly held together by a hydraulic lock. By controlling the flow of oil to and from the chambers the movement of the outer part relative to the inner part in response to inertia forces created by piston reciprocation and combustion chamber pressure is controlled for varying the clearance volume of the cylinder and thereby maintains a constant peak cycle pressure.

The hydraulic circuits heretofore used for controlling flow to the chambers include valves which direct the oil from an external source to both the upper and lower chambers. A discharge valve opens a path from the upper chamber upon an excess of pressure being produced in that chamber by the firing pressure. The oil from the upper chamber in that event is dumped through an orifice to the crankcase to produce quick response of the piston to excess combustion chamber pressures. The aforementioned patents disclose constructions in which the oil is directed through a one-way inlet valve into the upper chamber. A discharge valve is provided intermediate the upper chamber and the lower chamber and is operable to open upon a sufficient pressure increase in the upper chamber to direct the oil into a passage leading to the lower chamber. Valve means are provided at the entrance to the lower chamber to prevent the oil from leaving the lower chamber other than through a restricted orifice provided to permit controlled leakage.

The present disclosure includes the features of the aforementioned patents but adds several important features. The present invention discloses a circuitry which provides for the volumetric differences between the upper and lower chambers and permits a sudden decrease in the volume of the upper chamber when this is desirable. A bypass passage is connected directly to the passage intermediate the chambers and is left open to the crankcase at all times. An orifice member is disposed within this bypass passage. There is approximately a three-to-one ratio between the change in volume of the upper chamber and the change in volume of the lower chamber for each increment of motion between the two piston parts. In this manner and by a proper dimensioning of the size of this orifice member with respect to the orifice permitting oil to escape from the lower chamber, the oil exceeding the lower chamber expansion rate will flow from the contracting upper chamber through the orifice in the bypass passage and to the crankcase.

It is an object then of the present invention to provide an improved variable compression ratio piston construction which permits the use of a more simplified valving arrangement for operation of the piston.

It is another object of the present invention to improve variable compression ratio pistons by using less valves than necessary for the operation of prior art concepts and those inventions disclosed in the aforementioned patents.

It is another object of the present invention to decrease the quantity of fluid flow required for each cycle of piston operation.

It is still another object of the present invention to improve variable compression ratio piston assemblies through the provision of a bypass passage intermediate the chambers and an orifice disposed within the bypass passage of predetermined opening dimensions with respect to the orifice for discharge to the lower chamber in accordance with the differences in volumetric change of the upper and the lower chamber.

Still further objects and advantages of the present invention will be readily apparent to one skilled in the art to which the present invention pertains upon reference to the following description in conjunction with the accompanying schematic drawing.

BRIEF DESCRIPTION OF THE DRAWING

The drawing is a schematical cross-sectional view illustrating a piston and a connecting rod connected to a crankshaft, having a normal clockwise operating direction as indicated by the arrow, the piston being shown on the left side in a high-compression ratio position and on the right side in a low-compression ratio position.

DESCRIPTION

Now referring to the drawing for a more detailed description of the present invention, there is illustrated a schematic construction of a variable compression ratio piston 10 adapted for use in an internal combustion engine. The piston 10 comprises an outer part 12 which is carried on an inner part 14. The outer part 12 has a crown 16 which serves as the head of the piston 10 and which forms the movable wall of the lower boundary of a combustion chamber 18 of the engine. The inner part 14 is axially slidable within and with respect to the outer part 12 and is provided with sealing ring means 22 which tightly engages the inner surfaces of the outer part 12. The inner part 14 is linked to a crank pin 24 by a connecting rod 26 and a piston pin 28 in the conventional manner. Thus, the inner part 14 is movable axially between fixed upper and lower limits in the manner of a conventional piston while the outer part 12 can move axially upwardly and downwardly relative to the inner part 14 within limits which will be presently described.

An upper variable volume chamber 30 is formed intermediate the upper surface of the inner part 14 and the lower surface of the crown 16. A lower variable volume chamber 32 is formed intermediate the lower surface formed by an annular recess at the lower end of the lower part 14 and by the upper surface of a ring 34 fixed to the outer part 12.

The ring 34 and a stop 17 in the lower surface of the crown 16 define the limits of axial movement of the outer part 12 relative to the inner part 14. This relative movement provides a variable distance from the center of the piston pin 28 to the top of the piston crown 16 to thereby vary the compression ratio of the engine by varying the clearance volume of the combustion chamber 18 substantially in the manner disclosed in the aforementioned patents.

This movement of the outer part 12 relative to the inner part 14 is automatically controlled by regulating the flow of an incompressible fluid into and out of the chambers 30 and 32. The control fluid comprises oil supplied to the piston 10 from the pressurized lubricating oil supply of the engine via oil passages 38 and 39 in a crankshaft 37 and a passage 40 in the connecting rod 26. A one-way valve assembly 42 is carried in the foot of the rod 26 at the entrance to the passage 40. A slipper collector assembly 46 directs the oil to a passage 52 formed in the inner part 14.

The passage 52 is connected with chamber 30 through a discharge valve assembly 60. A passage 64 interconnects with the passage 52 and carries one-way inlet supply valves 66 and 68 for supplying fluid through the passage 64 to the upper chamber 30 and the lower chamber 32, respectively. Intermediate the passage 52 and the valve 68 is an orifice 70 which enables disposal of fluid into the crankcase (not shown).

The foot valve 42 is a one-way check valve. It should be noted that the axial accelerations of the connecting rod 26 forces the fluid in the passage 40 to open and close the valve 42 thus causing an upward pumping action. It should further be noticed that the inertia forces that produce upward movement of the outer part 12 enlarges the chamber 30 permitting fluid to flow through the check valves 42 and 66.

The valve 66 is similar to the valve 68 but is disposed in a direction reverse to that of the valve 68. The valve 60 is shown as a conventional discharge valve having resilient means and which will open to the passage 52 upon a predetermined pressure in the chamber 30. The valve 60 is preferably of the type shown in a number of the aforementioned patents in that it opens upwardly in response to pressure increases above it.

The inertia forces tending to produce upward movement of the outer part 12 also tend to close the inlet valve assembly 66 to thereby prevent the oil from escaping from the chamber 32 by way of the passage 64 and the orifice 70.

An orifice 74 is provided restricting the flow of oil from the lower chamber 32.

OPERATION

Assume that the combustion chamber pressure is below a predetermined maximum value which the variable compression ratio piston 10 is designed to maintain and that the upper and lower chambers 30 and 32 are both filled with oil, as escape of oil from the chambers 30 and 32 is prevented by the valves 66 and 68. The check valve 42 causes the oil column in the passage 40 and the upper part of 64 to act as an oil pump as the piston 10 accelerates along the cylinder center line.

With the provision of some means for the oil to escape from the chambers 30 and 32 the system would be hydraulically locked and no motion would be possible between the two parts, the inner part 14 and outer part 12.

The orifice 74 connecting with the lower chamber 32 provides a predetermined escape route for oil from the system and because of this the piston assembly becomes a hydraulic ratchet continuously tending to move the outer part 12 upwardly with respect to the inner part 14.

At the upper part of the stroke the inertia contained in the outer part 12 tends to move it upwardly as oil is supplied to the upper chamber 30 and the lower chamber 32 empties through the orifice 74. At the bottom of the stroke where the inertia forces are reversed no relative motion of the parts takes place as a hydraulic lock is recreated in the upper chamber 30 by the one-way valve 66. At each upward stroke, therefore, the outer part 12 moves upwardly a small amount. The magnitude of this motion is determined by the size of the orifice 74 and the amount of oil that is permitted to escape from the lower chamber 32 at each stroke. As the outer part 12 moves upwardly the distance between the top of the piston and the piston pin 28 center line increases. The combustion chamber clearance volume 18 above the piston in the cylinder decreases in size and the compression ratio increases.

Thus, like the previously disclosed arrangements upward movement of the outer part 12 relative to the inner part 14 may occur for several cycles to thereby increase the compression ratio of the engine until the combustion chamber firing pressure reaches a predetermined maximum value.

If the combustion chamber pressure increases beyond the prescribed value it will act on the crown 16 to urge the outer part 12 downwardly with respect to the inner part 14 to thereby increase the pressure within the chamber 30 and decrease it within the chamber 32. This increase in pressure in the chamber 30 if sufficient will open the valve 60 and direct oil via the passage 64 to the orifice 70 and via the valve 68 into the lower chamber 32 and out the orifice 74. It is clear then that in normal operations of the piston a state of relative equilibrium will exist wherein the outer part 12 will move up and down very slightly relative to the inner part 14 during each cycle of engine operation with its mean relative position being that position which produces the maximum combustion chamber pressure allowable as predetermined by the pressure response of the valve 60.

If the combustion chamber pressure is suddenly increased by increasing the fuel flow or by increasing the load on the engine the present invention operates so that the outer member 12 can move rapidly downwardly relative to the inner member 14 thereby increasing the combustion chamber clearance volume 18 and thus reduce the combustion chamber pressure to the desired maximum value within a few cycles of operation of the piston 10. This is achieved through the orifice member 70 disposed in the passage 64 and its relation in size to the orifice 74. For example, there is approximately a 3:1 ratio between the oil volume in the chamber 30 and the oil volume of the lower chamber 32 per unit of compression ratio change. Thus, by making the flow through the orifice 70 approximately three times that of the flow through the orifice 74, the orifice 70 will be effective to relieve that oil from the upper chamber 30 which is in excess of that which the lower chamber 32 is capable of receiving during periods of volumetric contraction of the upper chamber 30.

Thus, as the power demanded from the engine changes, the piston automatically readjusts to maintain the desired sum of the combustion chamber compression pressure and the pressure resulting from fuel burning.

The present construction has the advantages afforded by the constructions of the aforementioned patents in that the oil is normally discharged from the upper chamber 30 to the lower chamber 32 and is only discharged directly to the crankcase from the upper chamber 30 in situations where this is necessary. Thus, oil losses from the variable compression ratio piston are reduced which otherwise would tend to reduce the power of the engine and thus an increase of power will occur in the final shaft output.

It is also apparent that although I have disclosed but a single embodiment of the present invention other changes and modifications can be made therein without departing from the spirit of the invention as expressed by the scope of the appended claims.

Having thus described my invention I claim:

1. In a two-part variable compression ratio piston containing a first and a second chamber varying in opposing volumes at different rates and interconnected by connecting means a control system for regulating movement of said parts through a medium of fluid contained in said chambers comprising a first orifice venting said connecting means and a second orifice in said second chamber and wherein said orifices are proportioned in relation to the relative change in volume between said first and second chamber.

2. In a two-part variable compression ratio piston containing a first and a second chamber varying in opposing volumes at different rates a control system for regulating movement of said parts through a medium of fluid contained in said chambers comprising connecting means interconnecting said chambers, a first orifice venting said connecting means and a second orifice in said second chamber and wherein said orifices are proportioned in relation to the relative change in volume between said first and second chamber.

3. In a two-part variable compression ratio piston containing a first and a second chamber varying in opposing volumes at different rates, a control system for regulating movements of said parts comprising:
 (a) connecting means interconnecting said chambers,
 (b) an incompressible fluid contained in said chambers and used as an activating media for said control system,
 (c) a first orifice for venting said connecting means and a second orifice in said second chamber,
 (d) said orifices proportioned in relation to said relative change rate of volume between said first and second chamber so that said fluid flowing from said first chamber through said connecting means to said first orifice and said second chamber orifice is divided at substantially the same ratio.

4. In a variable compression ratio piston for an internal combustion engine, said piston having an inner part and a outer part movable relative to one another to vary the compression ratio of the engine, a control system for regulating movement of said parts comprising:
 (a) means defining a first chamber and a second chamber within said piston interconnected by connecting passage means, said first and second chambers varying in opposing volumes at different rates in response to said movement of said parts,
 (b) a connecting rod pivotally connected to said inner part,
 (c) means for supplying a pressure fluid to said first and said second chamber via said connecting rod,
 (d) means for discharging fluid from said first chamber to said connecting passage means upon a predetermined pressure increase in said first chamber,
 (e) said connecting passage means having a first venting orifice,
 (f) said second chamber provided with a second venting orifice, and
 (g) said orifice proportioned in opening size in relation to volume change between said first and second chamber so that discharge of said fluid from said first chamber is divided between said first orifice and said second chamber in substantially equal ratio of said volume change.

5. A variable compression ratio piston as claimed in claim 4, said supplying means comprising a slipper collector assembly disposed within said inner part and having a portion slidingly, sealingly engaging a portion of the connecting rod carrying said inner part, a passage provided in said connecting rod, a passage in said inner part for connection between said collector assembly and said connecting passage means and a one-way valve assembly carried in said connecting rod and operable to open fluid flow from said passage through said collector assembly and to said connecting passage means in one direction only and to prevent a reverse flow from said first chamber discharge means through said collector assembly and through said valve assembly.

6. In a variable compression ratio piston for an internal combustion engine, said piston having an inner part and an outer part movable relative to one another, a control system for regulating movement of said parts comprising:
 (a) means defining a first chamber and a second chamber within said piston and passage means connecting said chambers, said first and second chambers varying in opposing volumes in response to said movement of said parts with the volumetric capacity of said first chamber being a predetermined multiple of the volumetric capacity of said second chamber,
 (b) means for supplying incompressible fluid to said piston,
 (c) first one-way valve means disposed in said inner part for supplying said fluid to said first chamber and discharge valve means for discharging fluid from said first chamber into said passage means upon a predetermined pressure increase in said first chamber,
 (d) a secondary discharge path connected with said passage means intermediate said first and second chamber and a first orifice member carried in said secondary discharge path,
 (e) inlet valve means for admitting fluid from said passage means to said second chamber in response to an increase in volume of said second chamber, and
 (f) a second orifice member for discharging oil from said second chamber at a controlled rate and the diameter of the orifices of said first orifice member and said second orifice member being in a ratio substantially the same as the ratio of the changes in volumetric capacity of said first chamber to that of said second chamber.

7. In a variable compression ratio piston for an internal combustion engine, said piston having an inner part and a outer part, movable relative to one another, a control system for regulating movement of said parts, comprising:
(a) means defining a first and a second chamber within said piston, said chambers varying in opposing volume at different rates in response to said movement of said parts;
(b) a connecting rod, having passage means, pivotally connected to said inner part;
(c) a first one-way valve means in said connecting rod passage means admitting a supply of incompressible fluid to said inner part;
(d) a passageway in said inner part connected with said passage means of said rod;
(e) a second and third one-way valve means disposed in said passageway for admitting said fluid to said first and second chamber, respectively;
(f) a discharge valve means disposed in said first chamber for discharging fluid at a predetermined pressure in said first chamber to said passageway;
(g) said passageway having a first exit venting orifice member disposed intermediate said first and second chambers for discharging fluid from said first chamber by way of said passageway and a second orifice member for discharging fluid from said second chamber at a controlled rate and said first and second orifices having openings in ratio substantially the same as the ratio of volume change of said first chamber to that of said second chamber.

8. A variable compression ratio piston as claimed in claim 7 wherein said valve means in said connecting rod passage means imparts an inertial pumping action to said fluid during operation of said piston.

9. A variable compression ratio piston as claimed in claim 7, wherein said passage means is connected to said passageway through a resilient sealing member means.

References Cited

UNITED STATES PATENTS

| | | |
|---|---|---|
| 2,573,689 | 11/1951 | Butler. |
| 2,573,688 | 11/1951 | Butler. |
| 2,742,027 | 4/1956 | Mansfield. |
| 3,038,458 | 6/1962 | Mansfield. |
| 3,200,798 | 8/1965 | Mansfield. |
| 3,303,831 | 2/1967 | Sherman. |
| 3,311,096 | 3/1967 | Bachle et al. |

WENDELL E. BURNS, *Primary Examiner.*

U.S. Cl. X.R.

123—48